(12) United States Patent
Jackson

(10) Patent No.: US 7,389,941 B2
(45) Date of Patent: Jun. 24, 2008

(54) NOZZLE DEVICE AND METHOD FOR FORMING CRYOGENIC COMPOSITE FLUID SPRAY

(75) Inventor: David P. Jackson, Saugus, CA (US)

(73) Assignee: Cool Clean Technologies, Inc., Eagan, MN (US)

( * ) Notice: Subject to any disclaimer, the term of this patent is extended or adjusted under 35 U.S.C. 154(b) by 100 days.

(21) Appl. No.: 11/549,113

(22) Filed: Oct. 12, 2006

(65) Prior Publication Data

US 2007/0164130 A1    Jul. 19, 2007

Related U.S. Application Data

(60) Provisional application No. 60/726,466, filed on Oct. 13, 2005.

(51) Int. Cl.
*B05B 5/025* (2006.01)

(52) U.S. Cl. .............. 239/3; 239/8; 239/419.5; 239/422; 239/424; 239/425; 239/427; 239/428; 239/428.5; 239/433; 239/457; 239/704; 239/706; 239/DIG. 7; 134/7; 451/39; 62/52.1; 417/197

(58) Field of Classification Search .............. 239/3, 239/8, 419, 419.5, 422, 423, 424, 425, 427, 239/428, 428.5, 433, 457, 458, 504, 690, 239/704, 706, 707, DIG. 7; 134/7, 93; 451/39, 451/99, 102; 417/197; 62/52.1
See application file for complete search history.

(56) References Cited

U.S. PATENT DOCUMENTS 2,052,869 A    9/1936    Coanda
2,302,289 A    11/1942   Bramston-Cook
2,894,691 A    7/1959    Sedlacsik
3,047,208 A    7/1962    Coanda
3,117,726 A *  1/1964    Schoberg ............... 239/457

(Continued)

*Primary Examiner*—Steven J Ganey
(74) *Attorney, Agent, or Firm*—DuFault Law Firm, P.C.; Dustin R. DuFault

(57) ABSTRACT

The present invention includes a nozzle device and method for forming a composite fluid. The nozzle device generally comprises a nozzle portion connected to a main body. The main body includes an inner axial bore extending therethrough. An annular wall extends radially therefore and an annulus extends from an outer perimeter of the annular wall. The annulus and the annular wall define an annular chamber at least partially open to the atmosphere. A portal fluidly communicates the bore with the annular chamber. The nozzle portion includes a converging nose section also having an internal axial bore extending therethrough. An annular collar extends from the nose section and disposes at least partially within the annular chamber. A first tube for transporting a first fluid disposes within the axial bore of the main body and nose section, terminating at an exit port of the nozzle section. A second tube for transporting a second fluid disposes within the axial bore of the main body, terminating proximate the portal. A propellant fluid introduced under pressure into the bore of the main body directs the second fluid exiting the second tube into the annular chamber through the portal. Upon entering the annular chamber, the propellant fluid and the second fluid pass about the annular collar and travel along an outer surface of the nose section toward the exit port. The propellant fluid and the second fluid admix with the first fluid exiting the first tube and exit port to form the composite fluid outside the nozzle.

21 Claims, 4 Drawing Sheets

U.S. PATENT DOCUMENTS

| | | | | |
|---|---|---|---|---|
| 3,628,737 | A | * | 12/1971 | Norton .................. 239/DIG. 7 |
| 3,702,519 | A | | 11/1972 | Rice et al. |
| 3,708,993 | A | | 1/1973 | Hardt et al. |
| 3,743,186 | A | | 7/1973 | Mocarski |
| 3,795,367 | A | | 3/1974 | Mocarski |
| 3,801,020 | A | | 4/1974 | Mocarski |
| 3,806,039 | A | | 4/1974 | Mocarski |
| 3,984,054 | A | | 10/1976 | Frochaux |
| 3,985,302 | A | | 10/1976 | Frochaux |
| 4,038,786 | A | | 8/1977 | Fong |
| 4,046,492 | A | | 9/1977 | Inglis |
| 4,195,780 | A | | 4/1980 | Inglis |
| 4,336,017 | A | | 6/1982 | Desty |
| 4,341,347 | A | | 7/1982 | DeVittorio |
| 4,385,728 | A | | 5/1983 | Inglis et al. |
| 4,389,820 | A | | 6/1983 | Fong et al. |
| 4,555,059 | A | | 11/1985 | Collins et al. |
| 4,703,590 | A | | 11/1987 | Westergaard |
| 4,707,951 | A | | 11/1987 | Gibot et al. |
| 4,749,125 | A | | 6/1988 | Escallon et al. |
| 4,776,515 | A | | 10/1988 | Michalchik |
| 4,801,086 | A | * | 1/1989 | Noakes .......................... 239/3 |
| 4,806,171 | A | | 2/1989 | Whitlock et al. |
| 5,056,720 | A | | 10/1991 | Crum et al. |
| 5,125,979 | A | | 6/1992 | Swain et al. |
| 5,222,332 | A | * | 6/1993 | Mains, Jr. .................... 451/39 |
| 5,312,598 | A | | 5/1994 | Kersey et al. |
| 5,402,940 | A | | 4/1995 | Haller et al. |
| 5,409,418 | A | | 4/1995 | Krone-Schmidt et al. |
| 5,591,412 | A | | 1/1997 | Jones et al. |
| 5,611,491 | A | * | 3/1997 | Bowers ......................... 134/7 |
| 5,725,154 | A | | 3/1998 | Jackson |
| 5,918,817 | A | | 7/1999 | Kanno et al. |
| 6,039,269 | A | | 3/2000 | Mandzukic |
| 6,056,213 | A | | 5/2000 | Ruta et al. |
| 6,105,886 | A | | 8/2000 | Hollstein et al. |
| 6,125,787 | A | | 10/2000 | Mochizuki |
| 6,708,903 | B2 | | 3/2004 | Kanno |
| 7,097,717 | B2 | | 8/2006 | Jung et al. |
| 2004/0251327 | A1 | | 12/2004 | Messerly et al. |
| 2006/0027679 | A1 | | 2/2006 | Gratteau |
| 2006/0071091 | A1 | | 4/2006 | Ratinik |

* cited by examiner

NOZZLE DEVICE AND METHOD FOR FORMING CRYOGENIC COMPOSITE FLUID SPRAY

CROSS-REFERENCE TO RELATED APPLICATION(S)

This application claims the benefit of U.S. Provisional Patent Application No. 60/726,466 entitled TRIAXIAL COANDA APPARATUS AND METHOD FOR FORMING AND DELIVERING A COMPOSITE CRYOGENIC SPRAY, filed on 13 Oct. 2005, which is hereby incorporated herein by reference.

BACKGROUND OF INVENTION

The present invention generally relates to nozzles for forming and directing composite fluid sprays. More specifically, the present invention relates to nozzles for use in solid particle spray systems employing lubricants and dense fluids such as solid carbon dioxide.

Use of composite sprays for lubrication, cooling or both, is widely known in the art. Composite sprays are typically employed during machining processes requiring selective thermal control and/or lubrication during lathe machining, board cutting, wafer singulation or active electronic component thermal cycling. Composite sprays are also employed in high-speed metalworking and machining operations, such as turning, milling, facing, threading, boring and grooving, to extend insert life and provide for more precise machining.

There exist in the art several examples of nozzles which are employed to direct composite sprays onto substrates, work pieces, and the like, in manufacturing or industrial processes. Such examples include U.S. Pat. Nos. 3,985,302, 4,555,059, 4,195,780 and 5,725,154. Each of the aforementioned, however, have shortcomings in the application of composite sprays for lubricating and cooling purposes, more especially the application of cryogenic composite sprays for lubricating and cooling purposes.

Efficient and effective application of cryogenic composite sprays to machined substrates presents several challenges. When sufficiently high spray velocities are employed to provide enough energy to reach cutting zone surfaces, the majority of the spray tends to deflect from or stream around the cutting zone surfaces rather than impinge upon them. When low velocity sprays are employed, critical surfaces with recesses or complex surfaces cannot be penetrated effectively. Also, it is known that oil droplets, evenly finely atomized, tend to agglomerate into larger droplets during transition from spray nozzles to surfaces. This phenomenon interferes with the even distribution of coolants and lubricants on machined surfaces and causes a large portion of the atomized spray to miss the substrate entirely if positioned at a location too far away from the substrate being machined, wasting a portion of the applied spray. More importantly, though, cryogenic composite sprays comprising a lubricating component, such as an oil, and a cooling component, such as liquid/solid carbon dioxide, tend to be the most problematic in applying because the temperatures necessary to employ the coolant cause the lubricant to either solidify, gel or make non-atomizable. This problem is exacerbated when mixing of the cryogenic composite spray occurs within the nozzle, resulting in inconsistent spray patterns and/or the nozzle becoming clogged with agglomerated lubricant or cleaning agent.

BRIEF SUMMARY OF INVENTION

The present invention includes a nozzle device for mixing and directing a cryogenic composite fluid. The nozzle device generally includes a nozzle portion connected to a main body portion into which are disposed first and second tubes for conveying a first fluid and a second fluid, respectively, to be mixed, along with a propellant fluid, to form the composite fluid. The main body portion includes a cylinder containing a first axial bore extending therethrough with an annular wall extending radially therefrom. An annulus extending from the annular wall, along with the cylinder and annular wall, define an annular chamber at least partially open to the atmosphere. A portal positioned within the cylinder fluidly communicates the bore with the annular chamber.

The nozzle portion includes a tapered nose section attachable to the cylinder of the main body portion. The nose section contains a second axial bore communicating with the first bore and terminating at a distal end of the nose section. An annular collar extends from the nose section and is at least partially disposed within the annular chamber of the main body portion.

In operation, the first bore is supplied with the propellant fluid under pressure, preferably compressed air. The propellant fluid travels about the first and second tubes and enters the annular chamber through the portal. The second tube, terminating proximate the portal, supplies the second fluid, preferably a lubricant, which also travels into the annular chamber with assistance of the propellant fluid. Upon entering the annular chamber, both the propellant fluid and the second fluid pass about the annular collar and are directed out of the portion of the annular chamber open to the atmosphere and along the tapered nose section. The lubricant is urged along the outer surface of the nose section by the propellant fluid and any secondary atmospheric air accelerated through a Coanda effect. Upon approaching the distal end of the nose section, the propellant fluid and the second fluid admix with the first fluid, preferably particles of solid carbon dioxide, being emitted from the first tube and thus forming the composite fluid, which is directable onto a substrate surface.

Alternatively, an electrode connected to an electrical source is disposed within and extends slightly past the first tube. When activated, the electrode imparts an electrical charge to the composite fluid to assist in adhering the second fluid to the substrate through an electrostatic effect.

DETAILED DESCRIPTION

Figure 1:
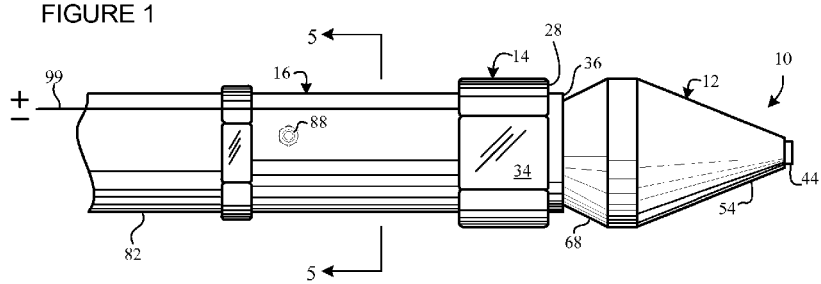
FIG. 1 is a side perspective view of a preferred embodiment of a nozzle device of the present invention.

A nozzle device of the present invention is generally indicated at 10 in FIG. 1. The nozzle device 10 generally includes a nozzle portion 12 connected to a main body 14. The main body 14 threadably attaches to a handling member 16. The handling member 16 can be constructed from metal or plastic, and provides a means by which a user can position the nozzle device 10 if hand-held directivity is so desired. The handling member 16 also provides an insulating effect to protect the user from uncomfortably cold temperatures if a cryogenic fluid is being utilized as the cooling agent in the formation of the composite fluid. By cryogenic fluid it is meant that dense fluid, preferably solid carbon dioxide, used at a temperature range of about 275 K to about 190 K. It should be noted, though, that the handling member 16 can be eliminated and the main body can be attachable to any suitable delivery means.

Figure 2:
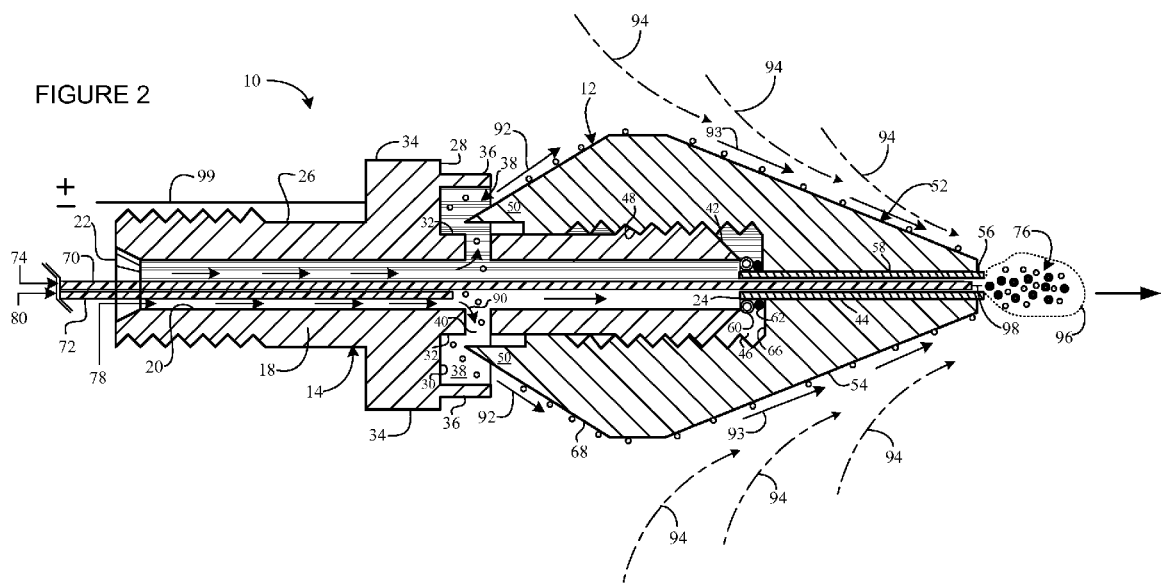
FIG. 2 is a cross-sectional view of the preferred embodiment of the nozzle device of the present invention.
Figure 3:
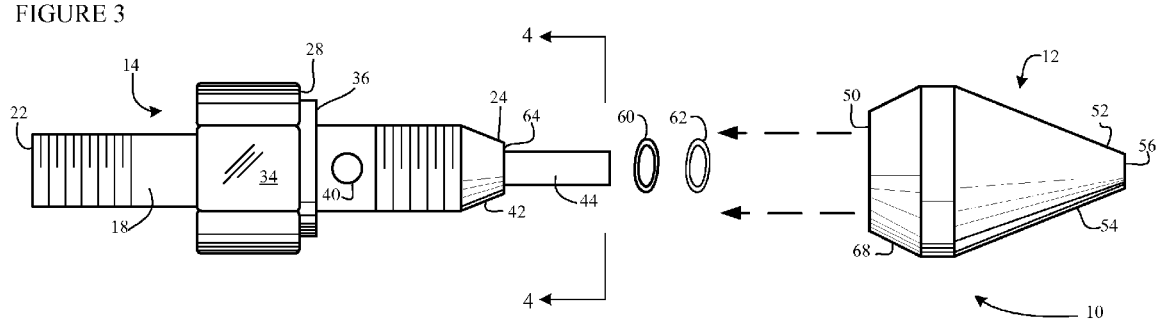
FIG. 3 is an exploded view of the preferred embodiment of the nozzle device of the present invention.
Figure 4:
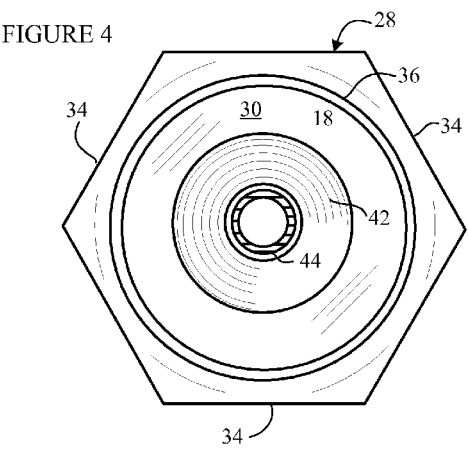
FIG. 4 is a cross-section view of the preferred embodiment of the present invention taken along lines 4-4 in FIG. 3.

As is illustrated in FIGS. 2, 3 and 4, the main body 14 is integrally formed from a cylindrical body 18 and includes a centrally positioned axial bore 20 extending therethrough from a proximal end 22 to a distal end 24. An outer surface 26 of the cylinder 18 is preferably threaded on both the proximal and distal ends, 22 and 24 respectively, for receiving and engaging the handling body 16 and the nozzle portion 12, respectively. Positioned about mid-way along the cylindrical body 18 is an integrally formed annular wall 28 extending radially from the cylinder 18. The annular wall 28 includes a distally facing wall surface 30. Outer surfaces 34 of the annular wall 28 also function as a means for providing torque to secure the handling body 16 to the main body 14. It should be noted, however, that while the accompanying illustrations show the outer surfaces 34 of the annular wall 28 to resemble a hex nut, any other suitable surfaces for exerting torque are well within the scope of the present invention.

Extending outward from the annular wall 28 proximate an outer perimeter is an annulus 36. The annulus 36, along with the distally facing surface 30 and outer surface 32 define an annular chamber 38 partially open to the atmosphere. The annular chamber 38 fluidly connects to the bore 20 through a plurality of ports 40 which are formed through the cylinder 18. The distal end 24 of the cylinder 18 preferably has a tapered surface 42 to which is attached a dielectric insulation tube 44. The tube 44, preferably manufactured from DELRIN® as provided by E. I. Du Pont Nemours and Company of Wilmington, Del., provides both thermal and electrical insulation when disposed within the nozzle portion 12.

As best illustrated in FIG. 2, the nozzle portion 12 includes a central cavity 46 for receiving the cylinder 18. Inner surfaces 48 of the cavity 46 are threaded and threadably engage the corresponding threaded surfaces of the cylinder 18. An annular collar 50 extending from the nozzle portion 12 disposes within the annular chamber 38 when the nozzle portion 12 is attached to the main body 14. The positioning of the annular collar 50 relative to the annular chamber 38 can be selectively modified by rotating the nozzle portion 12 relative to the main body 14. By employing generally accepted standards of right-handed threading, rotating the nozzle portion 12 in a clockwise direction relative to the main body 12 permits translational movement of the nozzle portion 12 toward main body 14, thereby disposing the annular collar 50 deeper within the annular chamber 38. Conversely, rotating the nozzle portion 12 in a counter-clockwise direction relative to the main body portion 14 permits translational movement of the nozzle portion 12 away from the main body 14, thereby withdrawing the annular collar 50 from the annular chamber 38. It should be understood, however, that if left-handed threads are employed, the opposite translational effect as just described will occur when turning the nozzle portion 12 either clockwise or counter-clockwise direction relative to the main body 14.

The nozzle portion 12 further includes a forward nozzle section 52. An outer surface 54 of the nozzle section 52 preferably includes a converging frusto-conical or tapered design. An exit port 56 defines a terminal end of a second axial bore 58 centrally positioned within the nozzle section 52. When the nozzle portion 12 threadably engages the main body 14, the second axial bore 58 aligns and communicates with the first axial bore 20, with the dielectric sleeve 44 disposing within the second axial bore 58. To secure the position of the nozzle portion 12 relative to the main body 14, a compressible rubber O-ring 60 and flat washer 62 are positioned over the dielectric sleeve 44. The O-ring 60 engages an outer surface 64 of the cylinder 18 while the flat washer 62 engages an inner wall 66 of the nozzle section 52. When compressed, the O-ring 60 is urged against the surface 64 and urges the flat washer 62 against the inner wall 66 to frictionally engage the nozzle portion 12 to the main body 14, thereby preventing rotational movement of the nozzle section 52. Such engagement should be sufficient enough such that a user can rotate the nozzle 12 without under hardship, and yet prevent the nozzle portion 12 from rotating relative to the main body 14 during use, whereby the nozzle portion 12 may detach and be projected away from the main body 14 at a dangerous velocity. Also, as illustrated in FIGS. 1, 2 and 3, the annular collar 50 includes a divergent or tapered outer surface 68. It should be noted, however, that modifying the degree the outer surface 68 is well within the scope of the present invention, including the outer surface 68 having a uniform diameter up to the forward nozzle section 52.

To transport and distribute the lubricant, coolant and/or cleaning agent components of the composite fluid into the nozzle device, first and second capillary tubes, 70 and 72 respectively, are provided. Each capillary 70, 72 is preferably constructed of PolyEtherEtherKetone (PEEK), having an inner diameter ranging from 0.1 millimeters to 6.5 millimeters and capable of withstanding pressures up to about 7000 kPa. It should be noted, however, that other materials of construction are well within the scope of the present invention including, but not limited to, stainless steel, nylon or other suitable material. Referring again to FIG. 2, the first capillary 70 disposes within the first axial bore 20 and traverses through the dielectric sleeve 44 disposed within the second axial bore 58. The first capillary 70 transports a first fluid 74, preferably a dense cryogenic fluid such as solid carbon dioxide particles, through the nozzle device 10 and out the exit port 56 whereupon the particles are mixed and accelerated to form a composite spray stream 76. There exist in the art several methods of producing a particle stream of carbon dioxide for use in the present invention. Alternatively, the solid carbon dioxide particles for use in the present invention can be those as disclosed in commonly owned U.S. patent application Ser. No. 11/301,442, entitled CARBON DIOXIDE SNOW APPARATUS, or commonly owned U.S. application Ser. No. 11/301,466, entitled CRYOGENIC FLUID COMPOSITION, both of which are hereby incorporated herein by reference.

The first capillary 70 preferably terminates before the exit portal 56 to prevent build up of the first fluid and prevent electrical arcing between an electrode positioned thereabout and the grounded nozzle section 52, as will be described. However, it should be noted that it is well within the scope of the present invention to selectively modify the distance between the terminal end of the first capillary 70 and the exit port 56 to attenuate the flow of the first fluid 74, including extending the first capillary 70 past the exit port 56. Also, it should be noted that by disposing the first capillary 70 within the dielectric sleeve 44, such a fit does not necessarily form a hermetic seal between the first axial bore 20 and the second axial bore 58. As such, a small amount of propellant fluid 78 under pressure is allowed to pass about the first capillary 70 and through the dielectric sleeve 44 whereby the propellant fluid 78 exits the nozzle along with the dense fluid 74 exiting the first capillary 70.

A second fluid 80, preferably either a lubricant or cleaning agent, is transportable within and about the nozzle 10 by means of the second capillary tube 72 disposed within the first axial bore 14 of the main body portion. Suitable lubricants or cleaning agents for use as the second fluid 80 in the present invention provide lubricant enhancements such as viscosity adjustment, changes to film consistency, corrosion inhibition, and modification of lubricity, among other beneficial effects. Such lubricants are derived from a variety of organic and inorganic liquids, solids, and gases. Non-exhaustive examples of the second fluid 80 include: bio-based oils, alcohols and esters such as rapeseed, ThetraHydroFurfurylAlcohol (THFA) and ethyl lactate; soy methyl esters; petroleum oils; alcohols such as isopropanol (IPA) and ethanol; ketones such as acetone and MEK; polyglycols; phosphate esters; phosphate ethers; synthetic hydrocarbons; DiethyleneGlycolMonobutylEther (DGME); and silicones. Non-exhaustive examples of organic gases include carbon dioxide and condenseable hydrocarbon additives such as HydroFluoroCarbon 134a, a refrigerant gas and butane. Non-exhaustive examples of solids include: oxidation, corrosion and rust inhibitors; extreme pressure agents such as chlorinated paraffinic oils; PolyTetraFluroEthylene (PTFE); boron nitride; pour point additives; detergents; dispersants; foam inhibitors; hydrogen peroxide; percarbonic acid; water; and nanoscopic solid particles such as nanolubricants.

The second capillary 72 preferably terminates proximate ports 40 to release the second fluid 80 into the first axial bore 20. More preferably the second capillary 72 terminates prior to ports 40 such that the second fluid 80 is released into the first axial bore 20 to disperse the second fluid 80 from the first axial bore 20 into the annular chamber 38 through ports 40.

Each capillary 70, 72 is connected to respective fluid supplies (not shown) and are contained within a delivery line 82 threadably attached to the handling member 16. The delivery line 82 can be constructed of stainless steel, polyurethane, nylon or other suitable tubular material and capable of handling pressures preferably ranging from about 200 kPa to about 14 MPa, more preferably within a range of about 200 kPa to 1000 kPa. The delivery line 82 also delivers to the first axial bore 20 the propellant fluid 78, which is preferably a pressure and temperature regulated gas, such as clean dry air, argon, nitrogen, carbon dioxide or any mixtures thereof. The propellant fluid 78 flows about the capillary tubes 70, 72 within the delivery line 82 and the first axial bore 20. Flow of the propellant fluid 78, the first fluid 74, the second fluid 80 and any other desirable fluids may be independently controlled with respect to flow rate, pressure or temperature, and may be modified to contain any one or a combination of propellant and/or cryogenic fluid additives such as microabrasives, lubricant additives, condensable gases, chemical modifiers, oxidizers, organic compounds, cleaning agents including alcohol and soaps, and the like.

Figure 5:
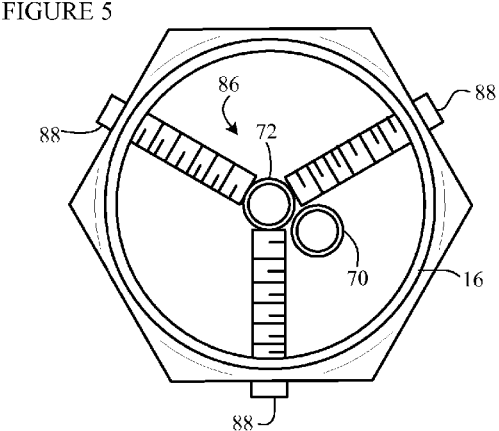
FIG. 5 is a cross-section view of the preferred embodiment of the present invention taken along lines 5-5 in FIG. 1.

When the propellant gas 78 is fed into the first axial bore 20, pressure within the bore 20 builds through the entire length. Pressure in a forward section 84 of the bore 20 tends to be greater than at the entrance, thereby creating a backpressure force on the second tube 72 terminating proximate the portals 40. This backpressure force tends to displace the flexible capillary 72, positioning the capillary 72 out of correct placement proximate the portals 40. To prevent the second capillary 72 from such displacement, a securing mechanism 86 is provided, as best illustrated in FIG. 5. The securing mechanism 86 includes a plurality of set screws 88 threadably engaged within the wall of the holding member 16. The set screws 88 preferably have hex heads which can be adjusted with a hex wrench. The second capillary tube 72 is positioned to be secured by terminal ends of each set screw 88, thereby securing the second capillary 72 into place. As is also illustrated in FIG. 5, the first capillary tube 70 is allowed to float freely within delivery tube 82 because the backpressure forces contained within the first axial bore 20 do not necessarily interact with the first capillary 70 as its terminal end is positioned beyond the first axial bore 20 and not under the influence of a backpressure. However, it should be noted that supplying a second securing mechanism (not shown) to secure the first capillary is well within the scope of the present invention. And while it is preferable to position the securing mechanism 88 within the holding member 16, it should be noted that any other suitable positioning of the securing mechanism 88 is well within the scope of the present invention, including positioning the securing mechanism 88 within the delivery tube 82 or within the cylinder walls 18 of the main body 14.

In operation, the propellant gas 78 is fed through the delivery line 82 and into the first axial bore 20 while the first fluid 74 is fed through the first capillary 70 and the second fluid 80 through the second capillary 72. The propellant gas 78 fills the entire volume of the bore 20, thereby building pressure within the bore 20. The second fluid 80 exiting the second capillary 74 disperses within the first axial bore 20 and is carried by the propellant gas 78. The propellant gas 78 and the second fluid 80 flow through the ports 40 and into the annular chamber 38, as indicated by arrows 90. Upon entering the annular chamber 38, the flow of the propellant gas 78 and second fluid 80 is directed by the annular collar 50 and the annular chamber 38, whereby the propellant gas 78 and second fluid 80 flow out of the annular chamber 38 and along the divergently tapered surface 68 of the annular collar 50 as indicated by arrows 92 and then along the convergently tapered surface 54 of the nozzle section 52 as indicated by arrows 93. This type of flow is generally known in the art as a "Coanda effect", whereby ambient atmospheric air 94 is drawn in by the propellant gas 78 to cause an accelerating effect along the outer surface of the nozzle. As illustrated in FIG. 2, the second fluid 80 travels as droplets along the outer surfaces 54, 68 of the nozzle portion 12. However, in practice and dependent upon the type of second fluid employed, the second fluid 80 may flow along the outer surfaces 54, 68 of the nozzle portion 12 as a thin film urged along by the propellant gas 78 and resulting ambient air 94 being accelerated by the Coanda effect on the nozzle portion 12.

Upon departing from the nozzle section 12, the secondary fluid 80, along with the propellant gas, admixes with the primary fluid 74 exiting the first capillary tube 70 to form the composite fluid spray 76 which may be directed onto a substrate during a machining or cleaning process. In other words, the formation of the composite fluid 76 does not occur inside the nozzle, but directly outside the nozzle as the first fluid 74 and the second fluid 80 depart therefrom in the propellant gas stream. This alleviates any undesirable interactions that may occur between the primary and secondary fluids 74, 80, including for example, the freezing of the secondary fluid inside the nozzle body 12 when contacting the relatively colder primary fluid. This permits the composite fluid 76 to contain beneficial properties of the primary fluid 74, including cooling effects, and the beneficial properties of the secondary fluid 80, including lubricating and/or cleaning effects, immediately prior to contact with the substrate including a more uniform dispersion of additives 80 into the cryogenic stream 76, more uniform particle size distribution control, more uniform electrostatic charge distribution and higher conversion of liquid carbon dioxide to solid carbon dioxide prior to the addition of any lubricant and/or cleaning agent.

Figure 6:
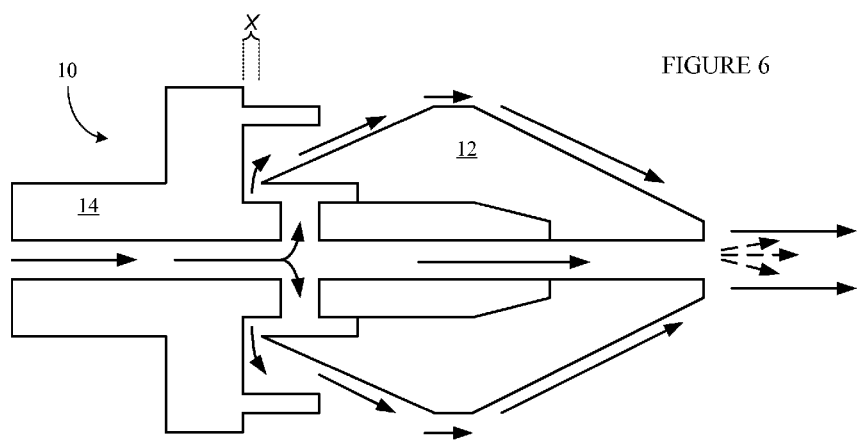
FIG. 6 is an illustrated diagram of a Coanda effect exhibiting a strong wall attachment.
Figure 7:
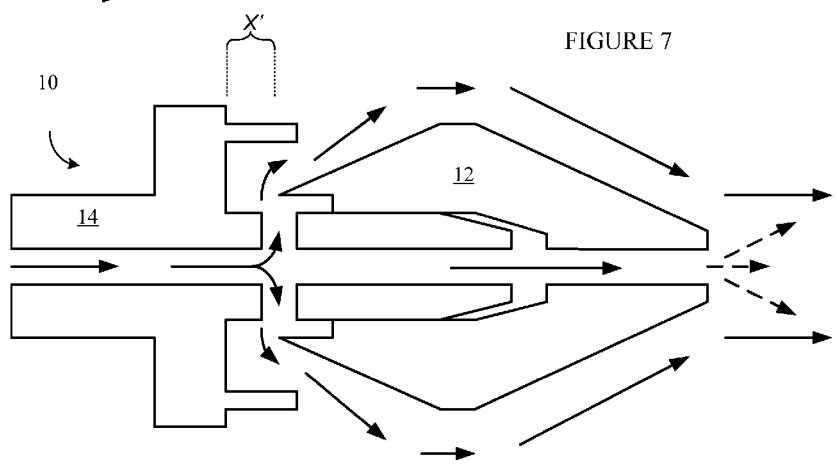
FIG. 7 is an illustrated diagram of a Coanda effect exhibiting a weak wall attachment.

Other properties of the composite fluid stream 76 can be controlled or adjusted by regulating several factors, including the mass flow rates of the propellant gas 78, the first fluid 74 and/or the second fluid 80. Also, the physical and kinetic properties, especially those related to the Coanda effect, of the composite stream 76 can be controlled by adjusting the position of the annular collar 50 relative to the annular chamber 38 as previously described herein. FIGS. 6 and 7 illustrate both strong and weak wall attachment of the Coanda flow. Referring to FIG. 6, as the annular collar 50 disposes deeper within the annular chamber 38, denoted by x, strong wall attachment of the Coanda flow occurs, resulting in a composite fluid stream 76 with higher force pressure. Referring to FIG. 7, as the annular collar 50 is positioned away from the annular chamber 38, denoted by x' with x'>x, weak wall attachment of the Coanda flow occurs, resulting in a composite fluid stream 76 with lower force pressure.

Alternatively, it may be desirable to charge the composite fluid stream 76 for electrostatic deposition of the composite fluid stream 76 onto the substrate being machined or cleaned. One method of producing a charge-on-demand composite spray is an induction charging system using an electrically isolated electrode at high potential, designed such that atomization of the composite spray occurs under the influence of a high electric field or corona. Another method of producing an electrostatic charge is by using the expansion of liquid carbon dioxide within a dielectric capillary tube over a distance. Electrostatic charges build and accumulate similar to a capacitor, resulting in the formation of small charged particles of solid carbon dioxide. As the two-phase solid/gas flows through the first tube, electrostatic charges are produced by the microscopic particles rubbing against other particles, between themselves and the tubing walls. Subsequently, these charges accumulate in the zones that are not earth/grounded at the end of the capillary condenser tube, and in a nozzle discharge assembly (bleeder). The size of these electrostatic fields on the tubing walls at the nozzle-bleeder assembly can reach values of up to 180 kV/m. Moreover, additional electrostatic energy is generated by the dry ice particles after they leave the discharge bleeder.

To produce a high intensity electric field 96, or corona, a metal wire 98 is disposed within the first tube 70 extending slightly past the terminal end, as illustrated in FIG. 2. The electrode 98, which is connected to a suitable electrical source (not shown), is introduced into the tube 70 prior to the tube 70 entering the delivery line. There are several means (not shown) known in the art for securing the wire within the first tube 74, including the use of a SWAGELOK® tube fitting available through Swagelok Company of Solon, Ohio. The nozzle device 10 is grounded by a grounding wire 99 which preferably attaches to the main body portion 12 and runs along the delivery line 82 to the electrical source or other suitable earth grounding means. Upon activating the electrical source, a high-voltage, low-amperage electrostatic field 96 is generated between the electrode 98 and the machined surface being lubricated. The electrical field preferably has a voltage in the range of 1 kV to 500 kV and an amperage range of 1 mA to 100 mA. The dielectric insulating sleeve 44 prevents the wire 98 from arcing onto the nozzle portion 52. The charge on the electrode 98 can be controlled by the operator. Lubricant or cleaning aerosol particles become charged (termed electrosols) as they pass through the ionized electrostatic field or corona 96, which controls the deposition rate and with the Coanda nozzle injection technology, the lubrication's location on the part. The nozzle spray 76 can be adjusted to direct the lubricant's flow, control pattern size, shape, and lubricant density as it is released from the applicator. The lubricant particles are attracted and held to the grounded machined substrate through electrostatic forces. The substrate simultaneously machined during the application of the electrosols. This method enables the application of thin layers of lubricants, with less volatilization of oils as mists, and more accurate placement within the cutting zone. This technology results in higher quality machined surfaces, less air pollution and less waste.

Figure 8:
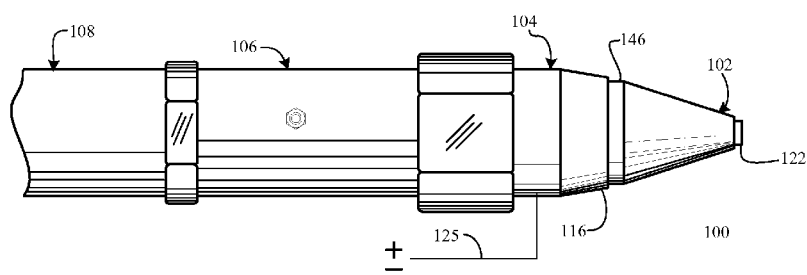
FIG. 8 is a side perspective view of a second embodiment of a nozzle device of the present invention.
Figure 9:
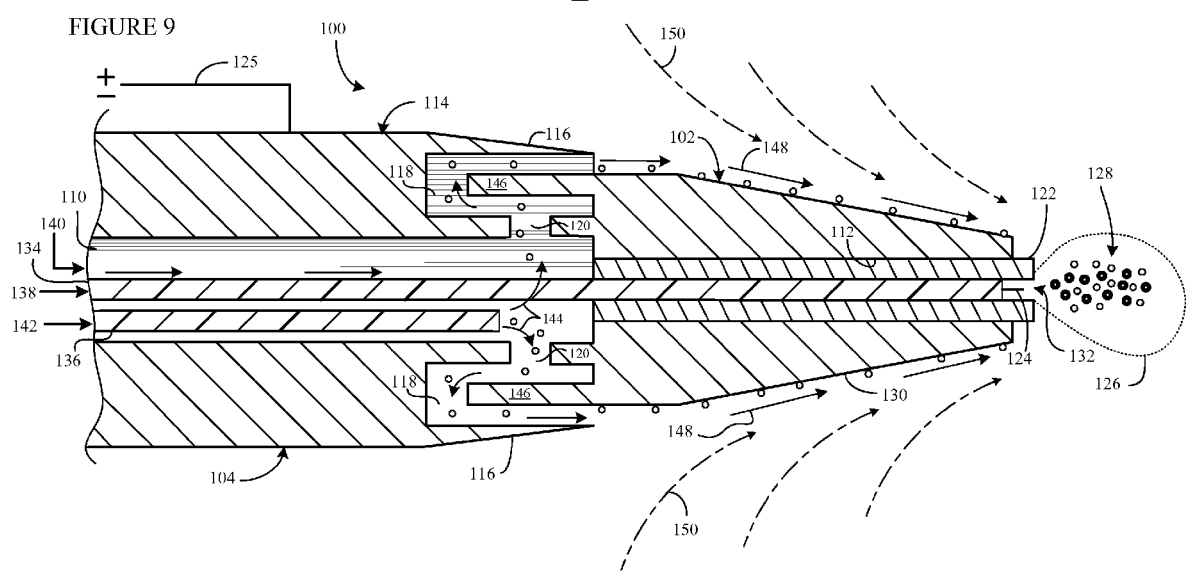
FIG. 9 is a cross section view of the second embodiment of the nozzle device of the present invention.

Referring now to FIGS. 8 and 9, an alternative embodiment of the nozzle device is indicated at 100. The nozzle device 100 of the alternative embodiment generally includes a nozzle section 102 integrally formed or fixedly attached to a main body portion 104. Thus, the primary difference between the alternative embodiment 100 and the preferred embodiment 10 is that the nozzle portion 102 is non-adjustable relative to the main body portion 104. The main body portion 104 preferably attaches to a handling member 106, which in turn attaches to a feed line 108. The handling member 106 can be constructed of a metal or plastic material, and provides a means by which a user can position the nozzle device 100 if hand-held directivity is so desired. The handling member 106 also provides an insulating effect to protect the user from uncomfortably cold temperatures if a cryogenic fluid is being utilized as the cooling agent in the formation of the composite fluid. The feed hose 108, similar to the delivery line 82 of the preferred embodiment 10, is of a variety generally found in the art, preferably constructed of a flexible material constructed of stainless steel, polyurethane, nylon or other suitable tubular material and capable of handling pressures preferably ranging from about 200 kPa to about 14 MPa, more preferably within a range of about 200 kPa to 1000 kPa. The selection of the type of material to be used in constructing the feed hose 108 is such to provide ease in positioning the nozzle device, whether the device be mounted to a structure in a machining/cleaning process or hand-held.

The nozzle device 100 includes a first centrally positioned axial bore 110 within the main body portion 104. A second centrally positioned axial bore 112 having a lesser diameter than and communicable with the first bore 110 is positioned within the nozzle portion 102. An annular wall 114 positioned about first axial bore 110 and an annulus 116 extending from an outer perimeter of the annular wall 114 define an annular chamber 118. The annular chamber 118 fluidly connects to the first bore 110 through a plurality of ports 120. Disposed within the second axial bore 112 is a dielectric insulator 122, preferably constructed from DELRIN®. The dielectric insulator 122 protects the nozzle portion 102 from arcing when an electrode 124 is employed to form a corona 126 and charge the composite stream 128, in the same manner as previously described with regard to the preferred embodiment 10, to which the nozzle device 100 is grounded by means 125. The nozzle portion 102 further includes an outer surface 130 preferably having a converging frusto-conical or tapered design, ending proximate at an exit port 132 of the nozzle. The exit port 132 defines a terminal end of the second axial bore 112 centrally positioned within the nozzle section 102.

To transport and distribute the lubricant, coolant and/or cleaning agent components of the composite fluid into the nozzle device, first and second capillary tubes, 134 and 136 respectively, are provided, similar to the preferred embodiment 10 as described above. The first capillary 134 disposes within the first axial bore 110, traversing through the dielectric sleeve 122 disposed within the second axial bore 112. The first capillary 134 transports a first fluid 138, preferably a dense fluid such as solid carbon dioxide particles, through the nozzle device 100 and out the exit port 132 where the particles are mixed and accelerated to form the composite spray stream 128. The first capillary 134 preferably terminates before the exit portal 132 to prevent build up of the first fluid 138 and prevent electrical arcing between the dielectric sleeve 122 and the grounded nozzle section 102. However, it is well within the scope of the present invention to selectively modify the distance between the terminal end of the first capillary 134 and the exit port 132 to attenuate the flow of the first fluid 138, including extending the first capillary 134 past the exit port 132. Also, it should be noted that by disposing the first capillary 134 within the dielectric sleeve 122, such a fit does not necessarily form a hermetic seal. As such, a small amount of propellant fluid 140 under pressure is allowed to pass about the first capillary 134 and through the dielectric sleeve 122 whereby the propellant fluid 140 exits the nozzle along with the dense fluid 138 exiting the first capillary 134.

A second fluid 142, preferably either a lubricant or cleaning agent, is transportable within and about the nozzle by means of the second capillary tube 136 disposed within the first axial bore 110. The second capillary 136 preferably terminates proximate the ports 120 to release the second fluid 142 into the first axial bore 110. More preferably the second capillary 136 terminates just prior to the ports 120 such that the second fluid 142 is released into the first axial bore 110 to disperse the second fluid 142 into the annular chamber 118. As with the preferred embodiment 10, the first capillary 134 and the second capillary 136 are connected to respective fluid supplies (not shown) and are contained within the delivery line 108 threadably attached to the handling member 106.

In operation, the propellant gas 140 is fed through the delivery line 108 and into the first axial bore 110 while the first fluid 138 is fed through the first capillary 134 and the second fluid 142 through the second capillary 136. The propellant gas 140 fills the entire volume of the bore 110, thereby building pressure within the bore 110. The second fluid 142 exiting the second capillary 136 disperses within the first axial bore 110 and is carried by the propellant gas 140. The propellant gas 140 and the second fluid 142 flow through the ports 120 and into the annular chamber 118, as indicated by arrows 144. Upon entering the annular chamber 118, the flow of the propellant gas 140 and second fluid 142 are directed by an annular collar 146 partially disposed within the annular chamber 118, whereby the propellant gas 140 and the second fluid 142 flow out of the annular chamber 118 and along the tapered surface 130 of the nozzle section 102 as indicated by arrows 148. While it is illustrated that the second fluid 142 travels as droplets along the outer surface 130, in practice and dependent upon the type of second fluid employed, the second fluid 142 may flow along the outer surface 130 as a thin film urged along by the propellant gas 140 and resulting ambient air 150 being accelerated by the Coanda effect on the nozzle portion 102.

Upon departing from the nozzle section 102, the secondary fluid 142, along with the propellant gas, admixes with the primary fluid 138 exiting the first capillary tube 134 to form the composite fluid spray 128 which may be directed onto a substrate during the machining or cleaning process. Similar to the preferred embodiment 10, the formation of the composite fluid 128 does not occur inside the nozzle 102, but immediately adjacent the nozzle 102 as the first fluid 138 and the second fluid 142 depart therefrom in the propellant gas stream 140, providing the same benefits as described with regard to the preferred embodiment 10.

Because the depth at which the annular collar 146 disposes within the annular chamber 118 is fixed, the Coanda flow wall attachment of the propellant gas 140 and second fluid 142 and resultant flow of the composite fluid 128 is regulated by adjusting the flow, pressure and temperature of the first fluid 138, the second fluid 142 and the propellant gas 140. Through the proper adjustments, an adjustable composite spray stream 128 is formed having a circumferential Coanda propellant-atmosphere flow stream portion and centrally positioned sublimating propellant-snow flow stream immediately in front of the nozzle exit port 132 and moving at relatively very high velocity ranging from approximately 50 meters per second to about 300 meters per second, depending upon the propellant pressure, mass flow and velocity flowing over the Coanda surface 130 for spray distances which are generally much longer than conventional jet nozzles. Juxtaposed against the preferred embodiment 10, the benefit of having an adjustable Coanda nozzle is that the coaxial pressure and ambient Coanda pressures can be dynamically balanced for any given snow flow rate and propellant pressure. The non-adjustable nozzle 100 of the second embodiment has a fixed Conada flow structure which is controlled through propellant pressure and temperature flow, and to a lesser extent the metered snow flow.

Although the present invention has been described with reference to preferred embodiments, workers skilled in the art will recognize that changes may be made in form and detail without departing from the spirit and scope of the invention.

The invention claimed is:

1. A nozzle device for mixing and directing a composite fluid comprising:
   a cylinder having a proximal end and a distal end, the cylinder containing an axial bore extending from the proximal end to the distal end;
   an annular wall extending radially from the cylinder;
   an annulus extending from the annular wall;
   an annular chamber at least partially open to the atmosphere, the annular chamber defined by the cylinder, the annular wall and the annulus;
   a portal positioned within the cylinder fluidly communicating the bore with the annular chamber;
   an annular collar connected to the cylinder and at least partially positionable within the annular chamber;
   a frusto-conical nose section extending from the annular collar toward the distal end of the bore;
   a first tube disposable within the bore for transporting a primary fluid, the first tube terminating proximate the distal end of the bore; and
   a second tube positionable within the bore for transporting a secondary fluid, the second tube having an open end terminating proximate the portal, wherein a propellant fluid flowing within the bore about the first and second tubes directs the secondary fluid exiting the second tube into the annular chamber through the portal, wherein the propellant fluid and the secondary fluid pass about the annular collar being directed by the annular chamber along the frusto-conical nose section toward the distal end of the bore, wherein the primary fluid exiting the distal end of the bore admixes with the propellant fluid and the secondary fluid to form the composite fluid outside the nozzle device.

2. The nozzle device of claim 1 wherein the first fluid comprises solidified particles of carbon dioxide.

3. The nozzle device of claim 2 wherein the second fluid comprises a lubricant or cleaning agent.

4. The device of claim 1 wherein the annular collar is positionable in relation to the annular chamber to adjust the flow of the propellant fluid about the frusto-conical nose section.

5. The device of claim 1 and further comprising a mechanism connected to the cylinder to secure either the first tube or the second tube, the mechanism including a plurality of set screws engageable with either tube.

6. The device of claim 1 and further comprising an electrode positioned within the first tube, the electrode connectable to an electrical source, wherein the electrode imparts an electrical charge to the composite fluid when charged by the electrical source.

7. The device of claim 6 and further comprising a dielectric sleeve positioned partially about the first tube within the bore proximate the nose section, the dielectric sleeve insulating the nose section from the electrically charged electrode.

8. The device of claim 7 wherein the dielectric sleeve extends past the distal end of the bore.

9. The device of claim 1 wherein the second tube terminates prior to the portal.

10. A nozzle device for mixing and directing a composite fluid comprising:
   a main body portion including a cylinder containing a first axial bore extending therethrough, an annular wall extending radially from the cylinder, an annulus extending from the annular wall, an annular chamber defined by the annulus, cylinder and annular wall, the annulus at least partially open to the atmosphere, and a portal positioned within the cylinder communicating the bore with the annular chamber;
   a nozzle portion connected to the main body portion, the nozzle portion including a tapered nose section attachable to the cylinder of the main body portion, the nose section containing a second axial bore terminating at a distal end of the nose section, the second bore communicating with the first bore, and an annular collar extending from the nose section, the annular collar at least partially positionable within the annular chamber of the main body portion;
   a first tube disposable within the first bore and the second bore for transporting a first fluid; and
   a second tube disposable within the first bore terminating proximate the portal, the second tube for transporting a second fluid, wherein a propellant fluid flowing within the bore about the first and second tubes directs the secondary fluid exiting the second tube into the annular chamber through the portal, wherein the propellant fluid and the secondary fluid pass about the annular collar being directed by the annular chamber along the tapered surface of the nose section toward the distal end of the bore, wherein the primary fluid exiting the distal end of the bore admixes with the propellant fluid and the secondary fluid to form the composite fluid outside the nozzle device.

11. The nozzle device of claim 10 wherein the second tube terminates prior to the portal.

12. The nozzle device of claim 10 and further comprising a cylindrical sleeve extending from the cylinder, the cylindrical sleeve communicating with the first bore and disposable within the second bore, wherein the tube is disposable within the cylindrical sleeve.

13. The nozzle device of claim 12 wherein the cylindrical sleeve includes an electrically insulating construction.

14. The nozzle device of claim 10 wherein the nozzle section threadably attaches to the main body portion, the nozzle section positionably adjustable to selectively modify the position of the annular collar within the annular chamber to modify the flow of the propellant fluid and the secondary fluid about the nose section.

15. The nozzle device of claim 10 and further comprising an electrode positioned within the first tube, the electrode connectable to an electrical source, wherein the wire imparts an electrical charge to the secondary fluid when charged by the electrical source.

16. The nozzle device of claim 15 wherein either the main body, the nozzle section or both are electrically grounded.

17. The device of claim 15 and further comprising a dielectric sleeve positioned partially about the first tube within the second bore, the dielectric sleeve insulating the nose section from the electrically charged electrode.

18. A method of forming a composite fluid comprising:
   providing a nozzle device comprising:
      a main body portion including a cylinder containing a first axial bore extending therethrough, an annular wall extending radially from the cylinder, an annulus extending from the annular wall, an annular chamber defined by the annulus, cylinder and annular wall, the annulus at least partially open to the atmosphere, and a portal positioned within the cylinder communicating the bore with the annular chamber;
      a nozzle portion connected to the main body portion, the nozzle portion including a tapered nose section attachable to the cylinder of the main body portion, the nose section containing a second axial bore terminating at a distal end of the nose section, the second bore communicating with the first bore, and an annular collar extending from the nose section, the annular collar at least partially positionable within the annular chamber of the main body portion;
      a first tube disposable within the first bore and the second bore for transporting a first fluid; and
      a second tube disposable within the first bore terminating proximate the portal, the second tube for transporting a second fluid;
   supplying the main body portion with a propellant gas;
   supplying the first tube with a first fluid; and
   supplying the second tube with a second fluid, wherein the propellant gas flowing within the bore about the first and second tubes directs the second fluid exiting the second tube into the annular chamber through the portal, wherein the propellant gas and the secondary fluid pass about the annular collar being directed by the annular chamber along the tapered nose section toward the distal end of the bore, wherein the first fluid exiting the distal end of the bore admixes with the propellant gas and the secondary fluid to form the composite fluid outside the nozzle device.

19. The method of claim 18 wherein the first fluid includes a cryogenically dense fluid and the second fluid includes a lubricant or a cleaning agent.

20. The method of claim 19 wherein the cryogenically dense fluid includes solidified particles of carbon dioxide.

21. The method of claim 18 wherein the nozzle device further comprises an electrode, the method further comprising activating the electrode to induce an electrostatic charge onto the composite fluid.

* * * * *